United States Patent
Simon et al.

(10) Patent No.: US 9,996,075 B2
(45) Date of Patent: Jun. 12, 2018

(54) INVERSE-CONTOUR MACHINING TO ELIMINATE RESIDUAL STRESS DISTORTION

(71) Applicant: Raytheon Company, Waltham, MA (US)

(72) Inventors: Robert T. Simon, Mckinney, TX (US); Kris E. Gregory, Plano, TX (US); Thomas Horstman, Arlington, TX (US)

(73) Assignee: Raytheon Company, Waltham, MA (US)

(*) Notice: Subject to any disclaimer, the term of this patent is extended or adjusted under 35 U.S.C. 154(b) by 132 days.

(21) Appl. No.: 14/783,406

(22) PCT Filed: Feb. 11, 2014

(86) PCT No.: PCT/US2014/015862
§ 371 (c)(1),
(2) Date: Oct. 8, 2015

(87) PCT Pub. No.: WO2014/168681
PCT Pub. Date: Oct. 16, 2014

(65) Prior Publication Data
US 2016/0054725 A1  Feb. 25, 2016

Related U.S. Application Data

(60) Provisional application No. 61/811,012, filed on Apr. 11, 2013.

(51) Int. Cl.
*G05B 19/40* (2006.01)
*B23C 3/00* (2006.01)
(Continued)

(52) U.S. Cl.
CPC ............ *G05B 19/4097* (2013.01); *B23C 3/00* (2013.01); *G05B 19/404* (2013.01);
(Continued)

(58) Field of Classification Search
CPC ...... B23C 3/00; G05B 19/404; G05B 19/4097
See application file for complete search history.

(56) References Cited

U.S. PATENT DOCUMENTS 6,934,642 B2  8/2005  Berry et al.
6,947,809 B2  9/2005  Ren et al.
(Continued)

FOREIGN PATENT DOCUMENTS

EP       1787176 A2    5/2007
WO   WO 2006/008554   1/2006

OTHER PUBLICATIONS

Suk-Hwan et al, "Incorporation of Tool Deflection in Tool Path Computation: Simulation and Analysis", Journal of Manufacturing Systems, Jan. 1996, pp. 190-199, vol. 15, No. 3, Society of Manufacturing Engineers, Dearborn, MI, USA.
(Continued)

*Primary Examiner* — Teresa M Ekiert

(57) ABSTRACT

A method for manufacturing a part to compensate for residual stress distortion is disclosed. The method can include obtaining a first part based on a nominal part. The first part can be distorted from the nominal part by residual stress. The method can also include determining a variation of the first part from the nominal part. The method can further include determining an offset of the variation relative to the nominal part to compensate for the variation. Additionally, the method can include making a second part using the offset of the variation, wherein residual stress distorts the second part within tolerance of the nominal part.

18 Claims, 3 Drawing Sheets

(51) Int. Cl.
*G05B 19/4097* (2006.01)
*G05B 19/404* (2006.01)

(52) U.S. Cl.
CPC ............ *B23C 2250/00* (2013.01); *G05B 2219/37308* (2013.01); *G05B 2219/37576* (2013.01); *G05B 2219/45145* (2013.01); *G05B 2219/49184* (2013.01)

(56) References Cited

U.S. PATENT DOCUMENTS

2004/0267462 A1 12/2004 Berry et al.
2009/0132080 A1 5/2009 Glasser

OTHER PUBLICATIONS

European application 14783260.4 granted Aug. 21, 2015, Raytheon Company.
International application PCT/US2014/015862 filed Feb. 11, 2014, Raytheon Company.
Lambda Research, "Minimizing Distortion in Machining", Diffraction Notes, 1999, pp. 4, No. 24, Lambda Research, Cincinnati, Ohio.
Search Report for International application PCT/US2014/015862 dated May 30, 2014, 15 pages.

INVERSE-CONTOUR MACHINING TO ELIMINATE RESIDUAL STRESS DISTORTION

BACKGROUND

Machining operations, such as milling or turning operations, are widely used to manufacture parts. Typically, a part is machined from a solid piece of material, such as a metal (e.g., aluminum, steel, etc.) billet. One problem often encountered when machining parts in this manner is due to residual stress in the material, which is generally caused by machining-induced residual stress as the result of local surface deformations caused by the cutting tool and/or by residual stress induced in material processing prior to machining, which are released during machining processes. Residual stress can cause distortion of the part, such as bowing, warping, and twisting, often resulting in the part being "out of tolerance" and unacceptable for use. This leads to scrapping the part or to reworking the part in an attempt to make the part acceptable. Such rework is often extensive and costly. Traditionally, machinists attempt to mitigate residual stress distortion by machining a part with successive roughing operations, with a time interval between roughing passes to allow residual stress distortion to occur, until a final part is achieved with a finishing pass or operation. Other approaches to solving the residual stress distortion problem involve altering the physical properties of the raw material or mechanically straightening parts after machining operations.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
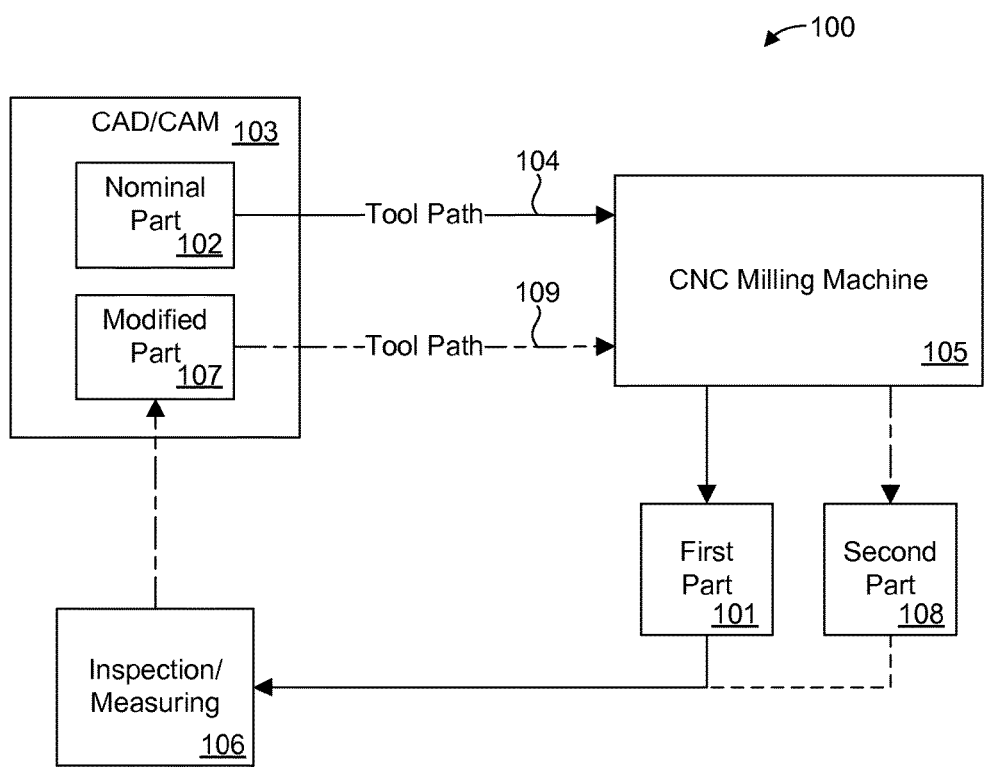
FIG. 1 illustrates aspects of a method for manufacturing a part to compensate for residual stress distortion, in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although other methods of addressing residual stress distortion have proven successful in some cases, these methods typically add significant costs due to the additional time and money required. Additionally, these methods may not prove effective for a given part, which may then require additional rework if the part is to be salvaged, adding more time and money to that already spent. Thus, significant costs can be avoided by machining parts in a manner that reduces or eliminates the negative effects of residual stress distortion without increasing cycle time or requiring rework.

Accordingly, a method for manufacturing a part is disclosed that compensates for residual stress distortion. In one aspect, the method can produce a part that is fully compliant to design requirements without any in-process adjustment or post-machining rework. The method can comprise obtaining a first part based on a nominal part, wherein the first part is distorted from the nominal part by residual stress. The method can also comprise determining a variation of the first part from the nominal part. The method can further comprise determining an offset of the variation relative to the nominal part to compensate for the variation. In addition, the method can comprise making a second part using the offset of the variation, wherein residual stress distorts the second part within tolerance of the nominal part.

In one aspect, a method for manufacturing a part to compensate for residual stress distortion can comprise determining a first tool path for machining a nominal part. The method can also comprise utilizing the first tool path to make a first part, wherein the first part is distorted from the nominal part by residual stress. The method can further comprise measuring the first part to determine a contour of a variation of the first part from the nominal part. The method can still further comprise inverting the contour relative to the nominal part to compensate for the variation. The method can even further comprise determining a second tool path using the inverted contour. Additionally, the method can comprise utilizing the second tool path to make a second part, wherein residual stress distorts the second part within tolerance of the nominal part.

In accordance with one embodiment of the present invention, a method for facilitating manufacture of a part to compensate for residual stress distortion is disclosed. The method can comprise determining an offset of a variation of a first part from a nominal part, wherein the first part is distorted from the nominal part by residual stress, and the offset of the variation is relative to the nominal part to compensate for the variation. In addition, the method can comprise determining a tool path configured to machine a second part using the offset of the variation, such that residual stress distorts the second part within tolerance of the nominal part. It is noted that no specific order is required in the methods disclosed herein, though generally in some embodiments, the method steps can be carried out sequentially.

Figure 2:
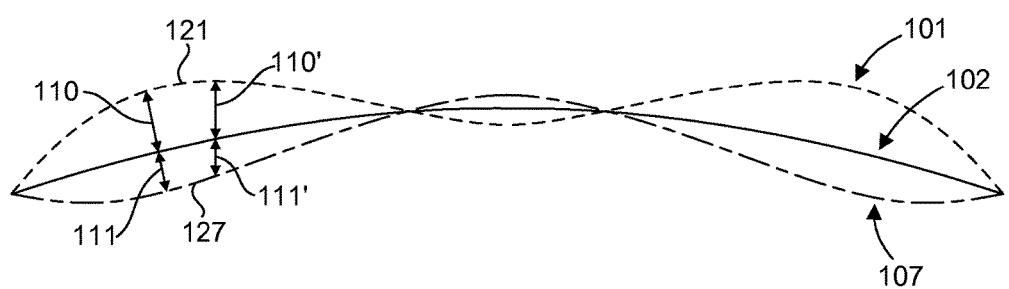
FIG. 2 illustrates a nominal part, a distorted part having variations from the nominal part due to residual stress distortion, and a modified part that is configured to offset the variations of the distorted part such that residual stress distorts the modified part within tolerance of the nominal part, in accordance with an embodiment of the present invention.

Aspects of one example of a method 100 for manufacturing a part to compensate for residual stress distortion are illustrated in FIGS. 1 and 2. The method 100 can comprise obtaining a first part 101 based on a nominal part 102. In some embodiments, the nominal part 102 can be modeled or represented in a CAD/CAM system or program 103. For example, the nominal part 102 can be a computer model or other suitable representation of a desired physical part. The CAD/CAM system or program 103 can be used to generate or determine a tool path 104 configured to guide or direct operation of a CNC machine 105, such as a mill or a lathe, to create the desired physical part. For example, the CAD/CAM system or program 103 can output a tool path 104 comprising "M & G codes" that are readable by the CNC machine 105 to execute movements of a cutter, such as an end mill, to machine the first part 101.

In many cases, however, the first part 101 can be distorted from the nominal part 102 by residual stress in the material of the first part 101, as illustrated in FIG. 2. Distortion caused by residual stress is generally caused by machining-induced residual stress and/or by residual stress induced in material processing prior to machining, sometimes referred to as material bulk stress. Machining-induced residual stress can be the result of local surface deformations caused by the cutter as a part is machined. With regard to material bulk stress, as the machining process removes material from a workpiece, such as a billet, residual stresses in the material from heat treat and quench processes are released, which causes the balance of tensile and compressive stresses in the material to be disrupted. When the machining process is completed and the part is unrestrained, these residual stresses can cause distortion of the part, such as bowing, warping, and twisting.

Accordingly, the method 100 can also comprise determining a variation 110 of the first part 101 from the nominal part 102. The first part 101 can be measured and/or inspected 106 by utilizing a coordinate measuring machine, a universal measuring machine, and/or a three-dimensional scanner, or any other suitable measurement/inspection device. Once measured and/or inspected, the first part 101 can be compared to the nominal part 102 to determine the variation 110 of the first part 101 from the nominal part 102 or, in other words, the tendency of the first part 101 to distort due to residual stress. In some cases, residual stress distortion causes the first part 101 to be "out of tolerance" relative to the nominal part 102.

The method 100 can therefore further comprise determining an offset 111 of the variation 110 relative to the nominal part 102 to compensate for the variation 110 due to residual stress distortion when an actual part is machined. In one aspect, the variation 110 and the offset 111 can be oriented normal to the surface of the nominal part 102. In another aspect, a variation 110' and an offset 111' can be oriented in any suitable direction, such as parallel to an axis used as a reference for the nominal part 102, to provide an offset for a given variation due to residual stress distortion. For example, as shown in FIG. 2, the variation 110' and the offset 111' can be parallel to a vertical axis used as a reference for the nominal part 102. In one aspect, determining an offset 111 of the variation 110 relative to the nominal part 102 can comprise applying a scaling factor to the variation 110 to properly compensate for the residual stress distortion that was predicted by the first part 101. For example, the offset 111 can be between about 20% and about 100% of the variation 110 and, particularly, between about 60% and about 80% of the variation. In some cases, the offset 111 can be greater than the variation 110. An appropriate scaling factor for the variation 110 to achieve an appropriate offset 111 may depend on the size of the part and how much material is to be removed from other areas of the part, such as an opposite side of the part.

In one aspect, the nominal part 102 can be used as a basis to create a modified part 107, which incorporates the offset 111 of the variation 110. The modified part 107, like the nominal part 102, can be a computer model or other suitable representation. In addition, the method 100 can comprise making a second part 108 using the offset 111 of the variation 110. Thus, the modified part 107 can be a "distorted" version of the nominal part 102 that is configured to offset the residual stress distortion that will affect the actual machined second part 108, as predicted based on the residual stress distortion affecting the first part 101. In one aspect, the CAD/CAM system or program 103 can be used to generate or determine a tool path 109 configured to guide or direct operation of the CNC milling machine 105 to machine the second part 108, based on the modified part 107. In another aspect, the tool path 104 used to make the first part 101 can be modified, based on the offset 111 of the variation 110, to determine the tool path 109 for machining the second part 108. For example, the tool path 109 can be modified version of the tool path 104, based on a desired offset 111, without the need for a modified part 107 or similar model.

When completed and unrestrained, residual stress distorts the second part 108, which may be in an out of tolerance "as-machined" condition due to the offset 111, to within tolerance of the nominal part 102. The second part 108 can be inspected and/or measured 106 to verify compliance with design requirements. Thus, rather than predicting part distortion to alter raw material specifications or fighting against residual stress distortion by "machining the distortion out," the method 100 can take actual distortion on a test part (101) into account and then adjust to compensate for the distortion on subsequent deliverable parts (102) and thereby negate the detrimental effects of the residual stress distortion. In other words, the method 100 is proactive in that it can take advantage of a material's natural tendency to distort during the machining process and let the second part 108 "go where it wants to go" to produce a fully compliant part that "ends up in the right place" after distortion. Accordingly, acceptable parts can be made in a single operation, with no in-process adjustments or post-machining rework. In some cases, a test part can be machined for each material lot since material bulk stress can vary from one material lot to another. In addition, the "adjusted" tool path 109 can be similar to the "original" tool path 104 in overall scheme, such as direction, step-over, etc., to minimize differences in machining-induced residual stress between the first part 101 and the second part 108.

It should be recognized that the nominal part can comprise any suitable shape or geometry. For example, the nominal part can comprise a curved surface and/or a flat surface. In some embodiments, the nominal part can have a flat configuration relative to a length and/or width, such as a wing or other airfoil. For example, in some embodiments, a nominal part can have a thickness to length ratio of at least 1:10. In addition, the methods disclosed herein can be applied to any part machined from billet stock, and may be particularly useful where large amounts of material are removed during the machining process and distortion due to release of residual stress is a potential problem. Furthermore, the methods disclosed herein can be applied to an entire part, or to an area of the part locally affected by residual stress distortion.

With continued reference to FIGS. 1 and 2, the method 100 can further comprise determining a contour 121, such as a curve or surface, that approximates the variation 110 for at least a portion of the first part 101 distorted by residual stress. For example, inspection and/or measuring 106 the first part 101 can define a curve or surface, or produce data points that can be used to model or approximate a curve or surface of the first part 101. In one aspect, a contour 121 can be determined by curve fitting and/or surface fitting data points of the first part 101 acquired by inspection/measuring 106, which can be done by interpolation and/or smoothing of the data points. Thus, determining a variation 110 of the first part 101 from the nominal part 102 can comprise comparing the contour 121 to a corresponding portion of the nominal part 102, such as by determining a distance of the contour 121 from a corresponding portion of the nominal part 102.

With the contour 121 defined, the contour 121 can be inverted relative to the nominal part 102, such as about a corresponding portion of the nominal part 102, such that the inverted contour 127 is offset 111 relative to the nominal part 102 in an opposite direction of the variation 110 to compensate for the variation 110. Thus, as shown in FIG. 2, the contour 121 of the first part 101 can be above the nominal part 102 at opposite ends and below the nominal part 102 in the center, while the inverted contour 127 is below the nominal part 102 at opposite ends and above the nominal part 102 in the center. In one aspect, the inverted contour 127 can be offset 111 from a corresponding portion of the nominal part 102 between about 20% and about 100% of the variation 110, although in some embodiments the offset can be greater than the variation or less than 20% of the variation.

In one aspect, the offset 111 of the variation 110 can be modeled, such as mathematically with an equation and/or in the CAD/CAM system or program 102 as a computer model. In a particular aspect, the offset 111 can be modeled with one or more variables to facilitate modification or adjustability of the offset to accommodate variable residual stress distortion, such as to adjust for different material lots that exhibit different bulk material stresses. For example, one such variable can be a control point used to define the inverted contour 127, which may be a curve or a surface of the modified part 107. Moving or editing the control point can alter the shape of the contour 127, which can locate the inverted contour 127 at a desired offset from the nominal part 102 to compensate for the variation 110. Such adjustments of the inverted contour 127 or other adjustments to the tool path can be done quickly by a tool path programmer while a machinist loads the next billet into the CNC machine 105 holding fixture, thus minimizing machine down time.

In its simplest form, the method 100 can be applied to a nominal part 102 having a straight or flat surface, where the residual stress distortion of the first part 101 can be modeled with a two-dimensional circular arc over the straight or flat surface. For example, ends of the distorted portion of the first part 101 can be used as "zero" to provide base or anchor points for defining the contour of the distorted portion. It should be recognized that any suitable location can be used as a base or anchor point to define and/or relate a distorted contour and an inverted contour. In one aspect, an inverse contour surface can be constructed using a surface projected along a series of arcs. As the part geometry and/or distortion becomes less uniform it may be helpful to develop an equation based on curve fitting through data points, such as those measured on a coordinate measuring machine. The inverse contour surface can then be generated by inverting the curve and using the equation of the inverted curve to create corresponding points in the CAD/CAM model. These points can then be used to define the new surface to be machined. In this case, the control of surface can be determined by scaling the inverted curve to create the necessary inverse shape to drive the completed part into tolerance. In one aspect, the anchor points can also define end points of the inverted contour. It should be recognized that the methods disclosed herein can be applied to any distorted part shape and inverted contours can be defined that approximate or model any inverted distorted part shape.

In one aspect, the second part 108 can be made by determining the tool path 109 configured to machine the inverted contour 127. In a particular aspect, the tool path 104 used to make the first part 101 can be modified, based on or using the inverted contour 127, to determine the tool path 109 for machining the second part 108. The resulting second part 108, when in an unrestrained free state, can distort due to residual stress, which was predicted by the first part 101, and into compliance with the nominal part 102.

Figure 3A:
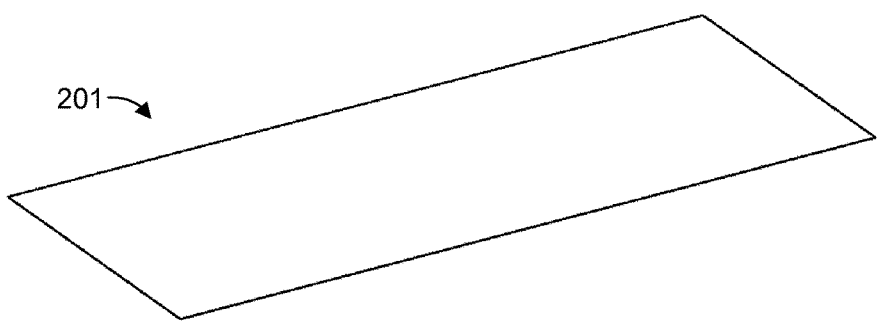
FIG. 3A is an example illustration of a first part machined according to a nominal part, in accordance with an embodiment of the present invention.
Figure 3B:
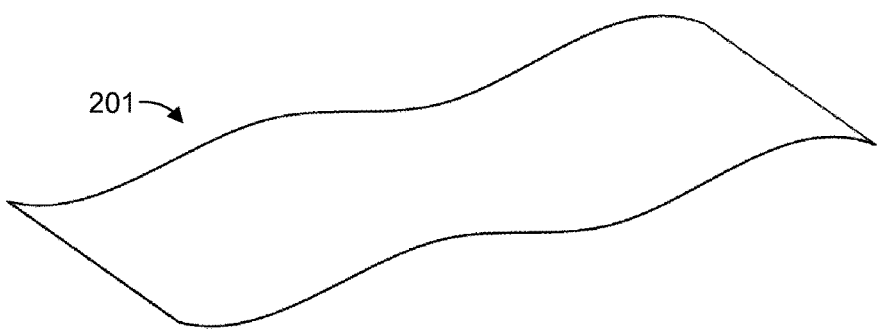
FIG. 3B is the first part of FIG. 3A in a free state distorted due to residual stress in the part.
Figure 3C:
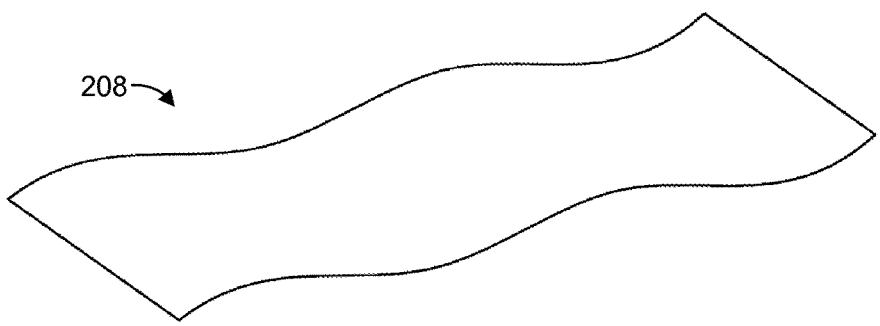
FIG. 3C is an example illustration of a second part machined to compensate for residual stress distortion.
Figure 3D:
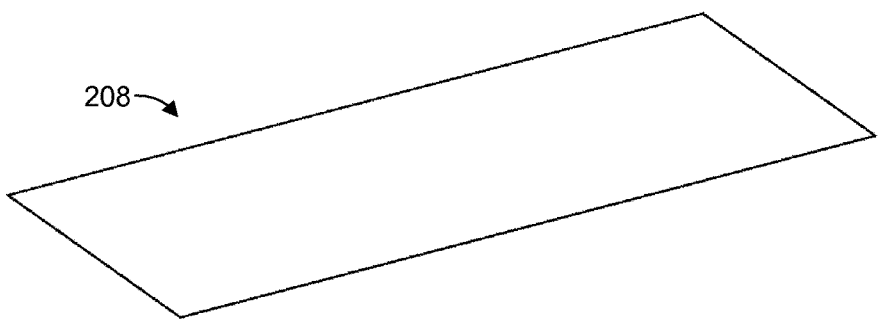
FIG. 3D is the second part of FIG. 3C in a free state where residual stress has distorted the second part to be within tolerance of the nominal part.

FIGS. 3A-3D illustrate an application of a method for manufacturing a part to compensate for residual stress distortion, as disclosed herein. In this case, a nominal part has a flat surface, which is machined flat (FIG. 3A) as a first part 201 but distorts due to residual stress that is released from the material and the first part 201 distorts when in the free state (FIG. 3B). The distorted part is measured to determine an inverted contour to offset the distortion, as disclosed hereinabove. A second part 208 is machined (FIG. 3C) with the inverted contour, which compensates for residual stress distortion in the second part 208 when in a free state (FIG. 3D) such that the second part 208 is within tolerance of the nominal part.

FIGS. 4A-4D illustrate another application of a method for manufacturing a part to compensate for residual stress distortion, as disclosed herein. In this case, a first part 301 is machined (FIG. 4A) according to a nominal part, which has a generally cylindrical outer shape with ends 331a, 332a that are parallel and a central surface 333a that is flat. When in a free state (FIG. 4B), however, the first part 301 distorts due to residual stress, such that the ends 331a, 332a angle relative to one another and are no longer parallel and the central surface 333a is bowed and no longer flat. A second part 308 is machined (FIG. 4C) such that the ends 331b, 332b have an opposite angle with respect to one another and the central surface 333b has an inverted bow or contour, as disclosed hereinabove. This compensates for residual stress distortion when in a free state (FIG. 4D) such that the ends 331b, 332b are parallel to one another and the central surface 333b is flat, and the second part 308 is within tolerance of the nominal part.

Figure 4A:
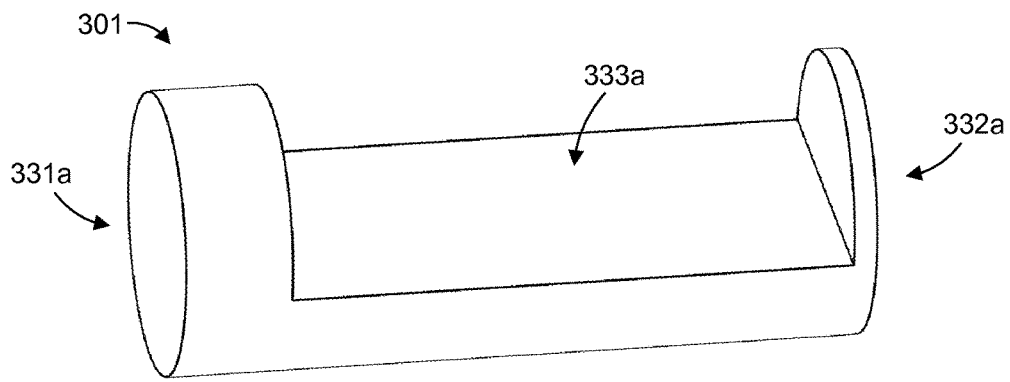
FIG. 4A is an example illustration of a first part machined according to a nominal part, in accordance with another embodiment of the present invention.
Figure 4B:
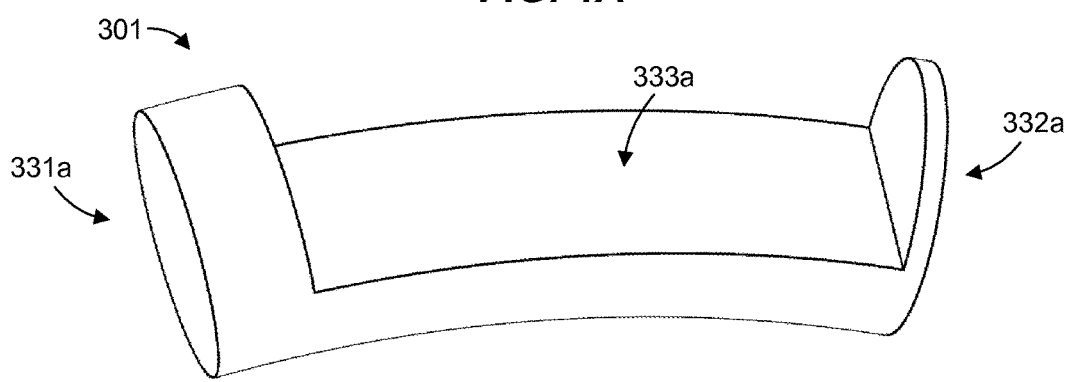
FIG. 4B is the first part of FIG. 4A in a free state distorted due to residual stress in the part.
Figure 4C:
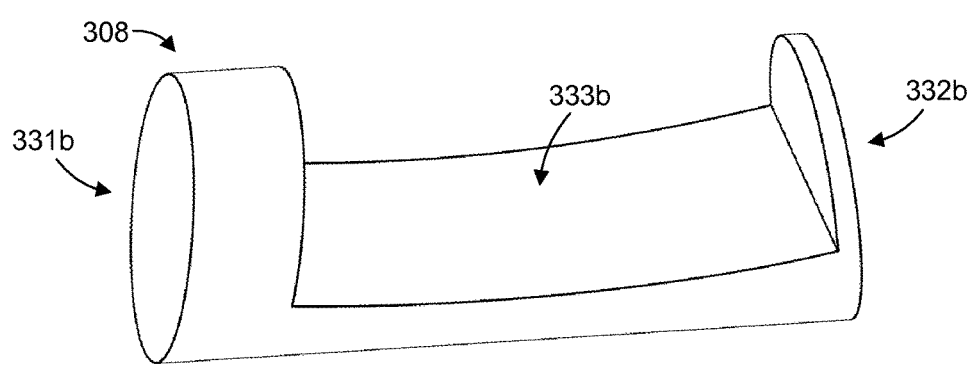
FIG. 4C is an example illustration of a second part machined to compensate for residual stress distortion.
Figure 4D:
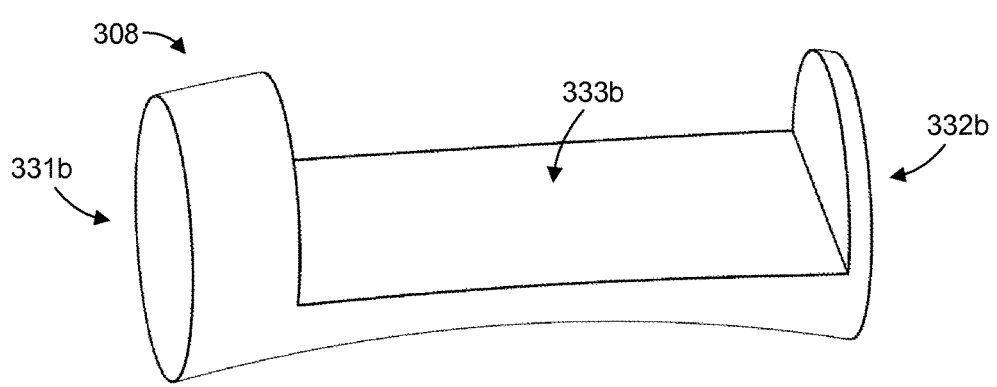
FIG. 4D is the second part of FIG. 4C in a free state where residual stress has distorted the second part to be within tolerance of the nominal part.

It is worth noting that in FIG. 4D the generally cylindrical shape is distorted and bowed. In this case, additional material can be removed, if desired, such that the final part more closely resembles the nominal part as machined in FIG. 4A. Such subsequent machining operations, however, can negatively impact the ends and/or the central surface due to residual stress distortion. Accordingly, the angles of the ends and the inverted bow or contour of the central surface can be configured to provide an in-tolerance part following removal of material that restores the cylindrical configuration of the nominal part illustrated as machined in FIG. 4A.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for manufacturing a part to compensate for residual stress distortion, comprising:
   obtaining a first part based on a nominal part, wherein the first part is distorted from the nominal part by residual stress;
   determining a variation of the first part from the nominal part, and determining a contour that approximates the variation for at least a portion of the first part;
   inverting the contour about a corresponding portion of the nominal part, such that the inverted contour is offset relative to the nominal part to compensate for the variation;
   determining an offset of the variation relative to the nominal part to compensate for the variation; and
   making a second part using the offset of the variation;
   determining a tool path configured to machine the inverted contour; and
   machining the second part using the tool path, wherein residual stress distorts the second part within tolerance of the nominal part.

2. The method of claim 1, wherein determining a variation of the first part from the nominal part further comprises determining a distance of the contour from a corresponding portion of the nominal part.

3. The method of claim 1, wherein the inverted contour is offset from the corresponding portion of the nominal part between 20% and 100% of the variation.

4. The method of claim 1, wherein determining a tool path configured to machine the inverted contour comprises modifying a first tool path used to make the first part, based on the inverted contour, to determine a second tool path for machining the second part.

5. The method of claim 1, wherein determining a contour comprises at least one of curve fitting and surface fitting data points of the first part.

6. The method of claim 5, wherein the at least one of curve fitting and surface fitting comprises interpolation, smoothing, or combinations thereof.

7. The method of claim 1, wherein determining a variation of the first part from the nominal part comprises:
   measuring the first part; and
   comparing the first part to the nominal part.

8. The method of claim 7, wherein measuring the first part comprises utilizing a coordinate measuring machine, a universal measuring machine, a three-dimensional scanner, or combinations thereof.

9. The method of claim 1, wherein determining an offset of the variation relative to the nominal part comprises applying a scaling factor to the variation.

10. The method of claim 1, wherein the offset is between 20% and 100% of the variation.

11. The method of claim 1, wherein the offset is between 60% and 80% of the variation.

12. The method of claim 1, further comprising modeling the offset of the variation.

13. The method of claim 12, wherein the offset of the variation is modeled with at least one variable to facilitate modification of the offset.

14. A method for manufacturing a part to compensate for residual stress distortion, comprising:

determining a first tool path for machining a nominal part;

utilizing the first tool path to make a first part, wherein the first part is distorted from the nominal part by residual stress;

measuring the first part to determine a contour of a variation of the first part from the nominal part;

inverting the contour relative to the nominal part to compensate for the variation;

determining a second tool path using the inverted contour; and utilizing the second tool path to make a second part, wherein residual stress distorts the second part within tolerance of the nominal part.

15. A method for manufacturing a part to compensate for residual stress distortion, comprising:

obtaining a first part based on a nominal part, wherein the first part is distorted from the nominal part by residual stress;

determining a variation of the first part from the nominal part, and determining a contour that approximates the variation for at least a portion of the first part, wherein determining a contour comprises at least one of curve fitting and surface fitting data points of the first part;

determining an offset of the variation relative to the nominal part to compensate for the variation; and making a second part using the offset of the variation, wherein residual stress distorts the second part within tolerance of the nominal part.

16. A method for manufacturing a part to compensate for residual stress distortion, comprising:

obtaining a first part based on a nominal part, wherein the first part is distorted from the nominal part by residual stress;

determining a variation of the first part from the nominal part;

determining an offset of the variation relative to the nominal part, comprising applying a scaling factor to the variation, to compensate for the variation; and making a second part using the offset of the variation, wherein residual stress distorts the second part within tolerance of the nominal part.

17. A method for manufacturing a part to compensate for residual stress distortion, comprising:

obtaining a first part based on a nominal part, wherein the first part is distorted from the nominal part by residual stress;

determining a variation of the first part from the nominal part;

determining an offset of the variation relative to the nominal part to compensate for the variation;

making a second part using the offset of the variation, wherein residual stress distorts the second part within tolerance of the nominal part; and modeling the offset of the variation.

18. The method of claim 17, wherein the offset of the variation is modeled with at least one variable to facilitate modification of the offset.

* * * * *